United States Patent
Mulinder et al.

(10) Patent No.: US 7,340,430 B2
(45) Date of Patent: Mar. 4, 2008

(54) REAL-TIME TRADING SYSTEM

(75) Inventors: Charles Mulinder, London (GB); Markus Reichenbach, Kaiseraugst (CH); Clyde Dawson, Maennedorf (CH); Roland Egli, Winterthur (CH); Chris Bruner, London (GB); Hiren Parikh, Chicago, IL (US)

(73) Assignee: UBS AG, Zurich (CH)

( * ) Notice: Subject to any disclaimer, the term of this patent is extended or adjusted under 35 U.S.C. 154(b) by 1094 days.

(21) Appl. No.: 09/963,241

(22) Filed: Sep. 26, 2001

(65) Prior Publication Data

US 2002/0073018 A1     Jun. 13, 2002

Related U.S. Application Data

(60) Provisional application No. 60/286,284, filed on Apr. 25, 2001, provisional application No. 60/236,248, filed on Sep. 28, 2000.

(51) Int. Cl.
    *G06Q 40/00*    (2006.01)

(52) U.S. Cl. ............................. 705/37; 705/35; 705/36; 705/26; 705/80

(58) Field of Classification Search .................... 705/37
    See application file for complete search history.

(56) References Cited

U.S. PATENT DOCUMENTS

| 5,787,402 A * | 7/1998 | Potter et al. ................. 705/37 |
| 2001/0056398 A1 | 12/2001 | Scheirer ....................... 705/38 |
| 2002/0016762 A1 | 2/2002 | Feilbogen et al. ............ 705/39 |
| 2002/0023053 A1 | 2/2002 | Szoe et al. .................... 705/39 |
| 2002/0082967 A1 * | 6/2002 | Kaminsky et al. ............ 705/37 |

FOREIGN PATENT DOCUMENTS

WO    WO 01/50776    7/2001

OTHER PUBLICATIONS

Int'l Search Report dated Sep. 18, 2002 for PCT/IB01/02249.
"Worldplay and E4X sign multi-currency partnership to extend global reach fo eCommerce" E4X Press Release, Mar. 30, 2000, (retrieved on Dec. 6, 2002). Retrieved from the Internet: www.e4x.com/worldplay.html.

* cited by examiner

*Primary Examiner*—Jagdish Patel
*Assistant Examiner*—Sara Chandler
(74) *Attorney, Agent, or Firm*—Proskauer Rose LLP

(57) ABSTRACT

A method and system is provided for managing risk associated with providing real-time trading services and includes the step of providing a plurality of dealing quotes wherein each of the plurality of dealing quotes having a duration. Next, an exposure associated with each of the dealing quotes during the respective durations is calculated. Next, a total exposure based on the exposures for all of the dealing quotes that have not expired is calculated. Finally, future dealing quotes are adjusted based on the total exposure.

48 Claims, 10 Drawing Sheets ary changes. To meet this need, # REAL-TIME TRADING SYSTEM

CROSS-REFERENCE TO RELATED APPLICATION

This application claims the benefit of the filing date of U.S. Provisional Application Ser. No. 60/236,248 entitled "Electronic Trade Interface" which was filed on Sep. 28, 2000 and U.S. Provisional Application Ser. No. 60/286,284 entitled "Real-time Trading System" which was filed on Apr. 25, 2001.

BACKGROUND

The following invention relates to a foreign exchange trading system and, in particular, to a system for managing the risk associated with providing real-time foreign exchange trading services.

Transactions that involve more that one currency is commonplace in a global economy. For example, a manufacturer producing a product in the United States may sell the product in Japan and receive the sales price in Japanese yen. The manufacturer needs a mechanism to exchange the yen to US dollars while avoiding risks associated with fluctuations in the USD/yen exchange rate. To meet this need, markets in foreign exchange ("FX") have emerged in which different currencies may be bought and sold thereby enabling the manufacturer to hedge its yen position. In addition to using the FX markets to facilitate global trade, the FX markets are also used by speculators to bet on the future price of a particular currency.

Typically, an investor desiring to trade foreign currencies contacts a financial institution that provides FX trading services. Initially, the investor may contact a representative of the financial institution, for example a currency trader, and request a price for a transaction involving a particular currency pair. The currency trader then evaluates a number of factors, such as the existing exchange rate between the currency pair, the size of the requested transaction and the status of the investor requesting the transaction, and provides the investor with a quote for the desired transaction. Because of the time required to generate an initial quote and the rate at which the FX markets changes, the initial quote provided by the currency trader is generally just an indicative quote and not a dealing quote upon which the trader may trade. To place a trade, the investor must request a dealing quote from the currency trader and the investor is typically given just a few seconds to actually accept a trade once a dealing price is provided by the currency trader. If the investor does not accept the trade within the allotted time, the investor must request a new dealing price quote on which to trade.

There are numerous drawbacks in the prior art FX trading process that arise primarily from the nature of the FX markets and the fact that FX price quotes are typically generated manually buy a currency trader employed by a financial institution. First, because it may take considerable time for the currency trader to provide a client with a price quote, the client has little time to decide whether to trade and in many instances won't trade based on a particular quote because of changes that occurred in the market since receiving the quote. Furthermore, because price quotes are generated manually by currency traders based on their view of the FX market at any given time, price quotes for FX transactions are often subjective and vary from currency trader to currency trader. Also, because the financial institution often must employ numerous traders to provide FX price quotes and execute transactions for their client base, providing FX services is costly.

A prior art FX trading system disclosed in U.S. Pat. No. 5,787,402 and assigned to Crossmar (the "'402 patent"), attempts to automate certain aspects of FX trading. In the '402 patent, a bank provides its customers with a system that the customers can access on-line and in real time through various terminals such as, for example, a personal computer. By inputting information in response to prompts on the screen, the system identifies the nature of the transaction the customer desires and the customer inputs the characteristics of the transaction the customer desires. The system then automatically generates an offer in response to the customer's request based upon a number of parameters including the market price, the size and nature of the transaction and the size and nature of the client. The system then promptly displays the bank's offer to the customer. The customer is then given an opportunity to accept the offer, ask that the offer be updated or reject the offer. If the customer delays for too long a period of time in deciding to accept or reject the offer, the system automatically withdraws and updates the offer thereby protecting the bank from liability for a "stale" rate. If the offer is accepted by the customer, the trade is automatically forwarded for processing including settlement and reporting.

While the '402 patent discloses a system that automates the process of generating a price quote so that the price quotes received by customers are dealing quotes, the '402 patent does not address the risks to the financial institution that result from providing real-time dealing quotes. First, at any given time, numerous dealing quotes provided by the system may be outstanding and thus, if accepted, will affect the risk position of the financial institution that is acting as a counterparty to the transactions. The '402 patent does not provide the financial institution with a method for monitoring and managing this risk.

In addition, in the real-time dealing quote system of the '402 patent, at any given time, a particular investor may have received several outstanding dealing quotes upon which the investor may trade. If the investor chooses to trade on all, or even part, of the outstanding dealing quotes, the investor credit limit may be exceeded thereby putting the institution at risk. Thus, the system disclosed in '402 patent does not effectively manage the risks associated with provided dealing FX quotes in real-time.

The system disclosed in the '402 patent is further limited to a client-server architecture in which the investor accesses any of four FX applications through corresponding graphical user-interfaces defined by the system. Thus, the investor can only access the FX applications through the pre-defined user interfaces provided by the system. The '402 patent does not, however, disclose a method by which the investor can incorporate access to the FX services into the investor's existing applications or develop new applications incorporating the FX services.

Accordingly, it is desirable to provide a method and system for flexibly providing real-time FX trading services and managing the risks associated with such services.

SUMMARY OF THE INVENTION

The present invention is directed to overcoming the drawbacks of the prior art. Under the present invention a method and system is provided for managing risk associated with providing real-time trading services and includes the step of providing a plurality of dealing quotes wherein each of the plurality of dealing quotes having a duration. Next, an exposure associated with each of the dealing quotes during said respective durations is calculated. Next, a total exposure based on the exposures for all of the dealing quotes that have not expired is calculated. Finally, future dealing quotes are adjusted based on the total exposure.

In an exemplary embodiment, each of the plurality of dealing quotes are an offer to perform a trade in a security and each of the plurality of dealing quotes is based on a size of the trade. At least one of the plurality of dealing quotes are provided to a client having a status and the at least one of the plurality of dealing quotes are based on the status. In another exemplary embodiment, the plurality of dealing quotes are based on risk analysis and market volatility.

In yet another exemplary embodiment, at least one of the plurality of dealing quotes are an offer to a client to perform a trade in a security, the trade having a size and the client having credit, and wherein the step of providing a plurality of dealing quotes includes the steps of evaluating the credit of said client, providing the at least one of the plurality of dealing quotes to the client if the credit is acceptable and reserving a portion of the client's credit for the duration of the at least one of the plurality of dealing quotes. Furthermore, the portion of the client's credit is released if the duration has expired and the client has not performed a trade in the security based on the at least one of the plurality of dealing quotes.

In still yet another exemplary embodiment, the at least one of the plurality of dealing quotes are an offer to a client to perform a trade in a security and wherein the step of providing a plurality of dealing quotes includes the step of manually reviewing the at least one of the plurality of dealing quotes before the at least one of the plurality of dealing quotes is provided to the client.

In an exemplary embodiment, each of the plurality of dealing quotes has a size, and wherein the step of providing a plurality of dealing quotes further comprises the step of limiting the size of the plurality of dealing quotes. Also, each of the plurality of dealing quotes has a tenor, and the step of providing a plurality of dealing quotes further comprises the step of limiting the tenor of the plurality of dealing quotes. In addition, each of the plurality of dealing quotes has a spread, and wherein the step of providing a plurality of dealing quotes further comprises the step of widening the spread of the plurality of dealing quotes.

In yet another exemplary embodiment, the step of adjusting future dealing quotes includes the step of adjusting the duration, tenor and/or spread of the future dealing quotes. Also, the step of adjusting future dealing quotes includes the step of requiring that all of the future dealing quotes be reviewed manually.

In still yet another exemplary embodiment, at least one trade based on one of the plurality of dealing quotes is executed, a trade exposure associated with all of the at least one trade that has not been booked into a risk management system is calculated and future dealing quotes based on said trade exposure is adjusted. Furthermore, the at least one trade is booked into the risk management system.

In yet another exemplary embodiment, all of the at least one trade is aggregated and all of the at least one trade is booked into the risk management system when a threshold is reached. In one embodiment, the threshold is an aggregated notional amount and in another embodiment the threshold is a time limit.

The present invention also provides a method of managing risk associated with a plurality of price requests and includes the steps of aggregating the plurality of price requests into a block trade price request and providing a single dealing price quote for the block trade price request.

The present invention also provides a method of managing risk associated with a plurality of price requests, wherein some of the plurality of price requests have different currency pairs and some of the plurality of price requests have different tenors and includes the steps of aggregating the plurality of price requests according to the different currency pairs into currency pair groups, aggregating the plurality of price requests according to the tenors into tenor groups and providing a single dealing price quote for each of the currency pair groups and tenor groups.

The present invention also provides a method of managing risk associated with a plurality of price requests, wherein each of the price requests have a notional amount and no tenor and includes the steps of aggregating the plurality of price requests into a block trade price request, providing a single dealing price quote for the block trade price request based on a spot price, executing a block trade based on the block trade price request and booking the block trade into a risk management system.

In an exemplary embodiment, a tenor for at least one of the plurality of price requests is received, a portion of the block trade corresponding to the at least one of the plurality of price requests is removed from the risk management system and a trade corresponding to the at least one of the plurality of price requests based on the tenor is booked into the risk management system.

The present invention also includes a method for managing risk associated with a block trade price request and includes the step of providing a single dealing price quote for the block trade price request based on a spot price. Next, a block trade based on the block trade price request is executed and the block trade is booked into a risk management system. Next, at least one individual trade having a notional and a tenor is received and a portion of the block trade corresponding to said at least one individual trade is removed from the risk management system. Finally, a trade system corresponding to the at least one individual based on the notional and said tenor is booked into the risk management.

The present invention also provides a system for managing risk associated with providing real-time trading services and includes a quote engine that provides a plurality of dealing quotes with each of the plurality of dealing quotes having a duration. Also included is an exposure manager that calculates an exposure associated with each of the dealing quotes during the respective durations and calculates a total exposure based on the exposures for all of the dealing quotes that have not expired. Future dealing quotes provided by the system are adjusted by the quote engine based on the total exposure.

The present invention further provides a system for managing risk associated with a plurality of price requests that includes a block trade manager that aggregates the plurality of price requests into a block trade price request and provides a single dealing price quote for the block trade price request.

Further provided in the present invention is a system for managing risk associated with a plurality of price requests, wherein some of the plurality of price requests have different currency pairs and some of the plurality of price requests have different tenors. The system includes a block trade manager that aggregates the plurality of price requests according to the different currency pairs into currency pair groups and the plurality of price requests according to the tenors into tenor groups. The block trade manager provides a single dealing price quote for each of the currency pair groups and tenor groups.

Also included in the present invention is a system for managing risk associated with a plurality of price requests, wherein each of the price requests have a notional amount and no tenor. The system includes a block trade manager that aggregates the plurality of price requests into a block trade price request and provides a single dealing price quote for the block trade price request based on a spot price. The block trade manager then executes a block trade based on the block trade price request and books the block trade into a risk management system.

In an exemplary embodiment, the block trade manager receives a tenor for at least one of the plurality of price requests and removes from the risk management system a portion of the block trade corresponding to the at least one of said plurality of price requests. The block trade manager then books a trade into the risk management system corresponding to the at least one of the plurality of price requests based on the tenor.

The present invention also include a system for managing risk associated with a block trade price request and includes a block trade manager that provides a single dealing price quote for the block trade price request based on a spot price. The block trade manager then executes a block trade based on the block trade price request and books the block trade into a risk management system. The block trade manager then receives at least one individual trade having a notional and a tenor, removes from the risk management system a portion of the block trade corresponding to the at least one individual trade and books a trade into the risk management system corresponding to the at least one individual based on the notional and the tenor.

Accordingly, a method and system is provided for flexibly providing real-time FX trading services and managing the risks associated with such services.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which.

DETAILED DESCRIPTION OF THE PREFERRED EMBODIMENTS

Figure 1:
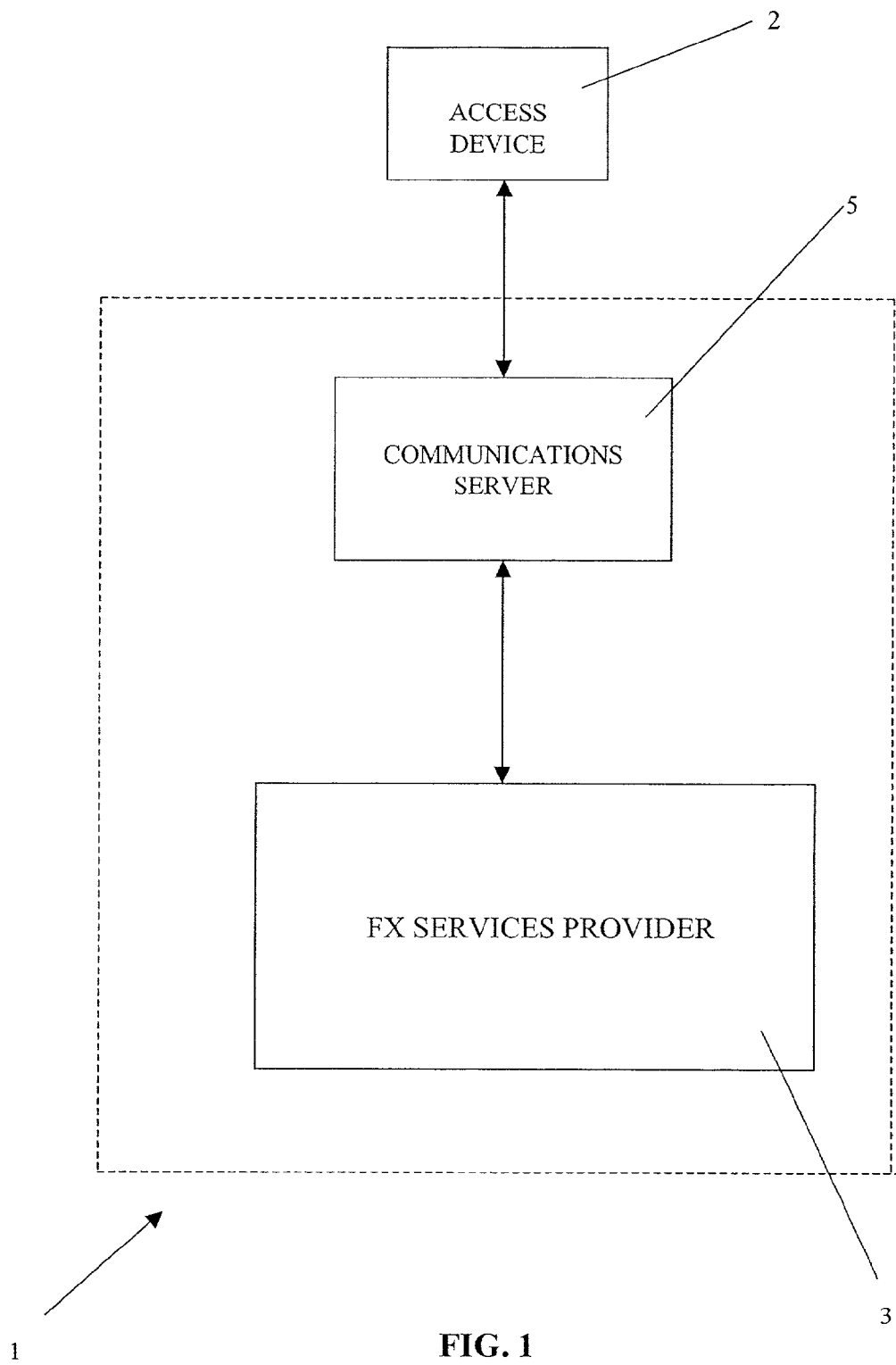
FIG. 1 is a system for providing FX trading services according to the present invention.

Referring now to FIG. 1, there is shown a system 1 for providing FX trading services according to the present invention. System 1 may be used by a financial institution desiring to provide FX trading services to its clients. System 1 includes an FX services provider 3 that provides FX services, such as FX price quotes, transaction and credit services, in a manner to be described below. In communication with FX services provider 3 is a communications server 5 that manages access to and communications with FX services provider 3. A client desiring access to the FX services provided by FX services provider 3 operates an access device 2, such as for example a personal computer, to communicate with communications server 5 using any know communications method, protocol and/or medium including, but not limited to, the Internet, dial-up lines, token-ring and/or Ethernet networks, T1 lines, asynchronous transfer mode links, wireless links, digital subscriber lines (DSL) and integrated service digital network (ISDN) connections. In addition, communications server 5 may secure access to FX services module 3 using any known technique such as, by way of non-limiting example, by requiring a client to provide a valid identification and password to gain access to FX services module 3 and by encrypting communications to and from FX services provider 3. It will be obvious to one of ordinary skill to use any other technique to provide a client with secure access to the FX services provided by FX services provider 3.

Figure 2:
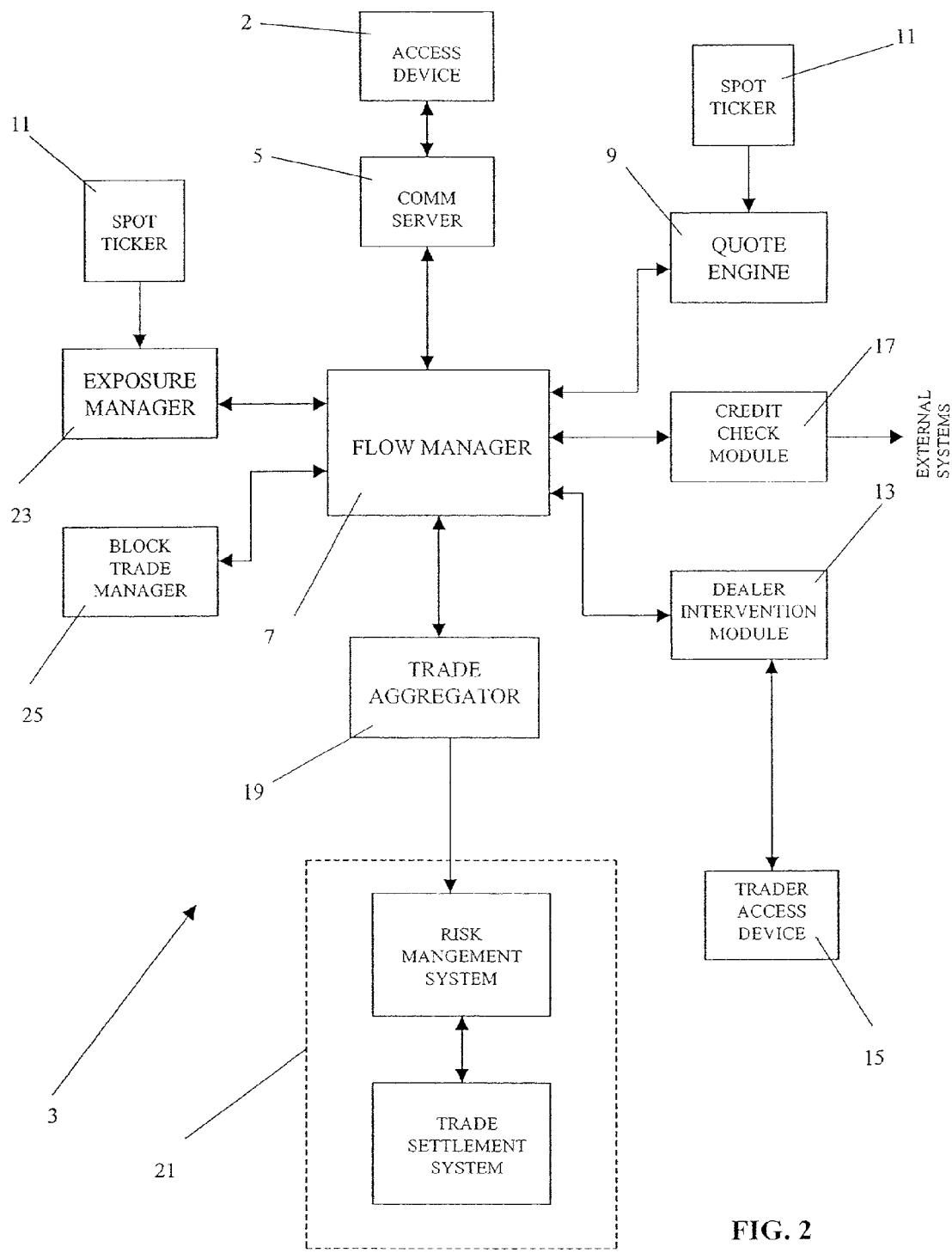
FIG. 2 is a block diagram of an FX services provider included in the system of FIG. 1.

Referring now to FIG. 2, there is shown a block diagram of FX services provider 3. FX services provider 3 includes a flow manager 7 that receives requests for services from a client operating access device 2 and coordinates the functions of the various modules contained in FX services provider 3. Flow manager 7 receives a price request from the client and forwards the price request to a quote engine 9 for pricing. Before a price quote is provided to the requesting client, quote engine 9 forwards the price request to a credit check module 17 to determine whether the client has the resources to execute the contemplated transaction. In certain situations, a dealer intervention module 13 is used by a trader operating a trader access device 15 to control the pricing and trading activity of FX services provider 3. If the client palaces a trade based on the price quote, flow manager 7 receives the trade request and sends it to a trade aggregator 19 that aggregates trades to prevent damage to the financial institution's real-time risk management and trade settlement systems 21. FX services provider 3 also includes an exposure manager 23 that tracks the financial institution's risk exposure as a result of providing to clients dealing quotes that remain valid for a given duration. Finally, FX services provider 3 also includes a block trade manager 25 that manages the price allocation and risk management for block trades. The operations of FX services provider 3 and components will now be described in greater detail.

Figure 3:
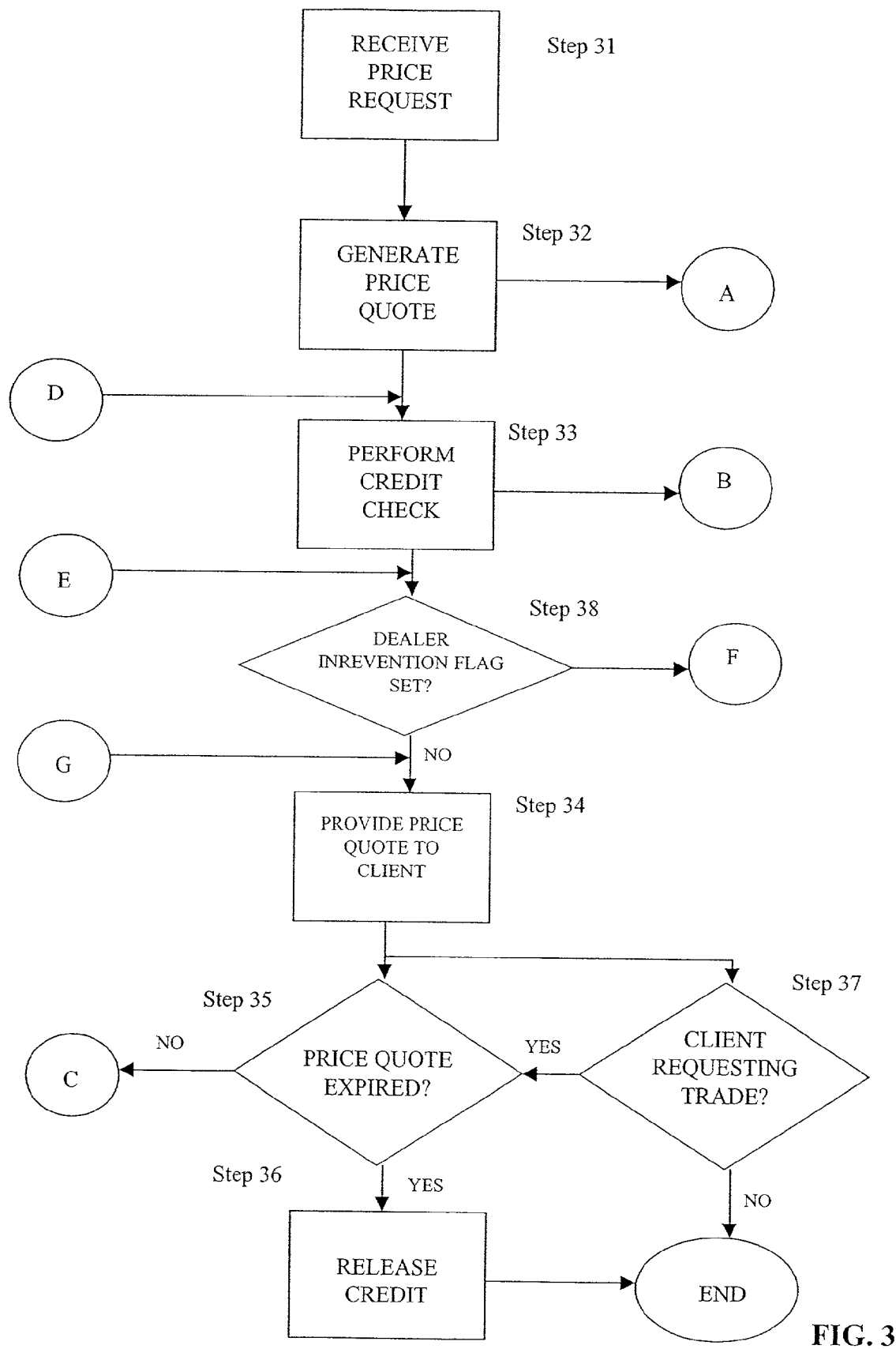
FIG. 3 is a flow chart describing the overall operations of the FX services provider of FIG. 2.

Referring now to FIG. 3, there is shown a flow chart describing the overall operations of FX services provider 3. Initially, in Step 31, flow manager 7 that receives requests for services from a client operating access device 2 and coordinates the functions of the various modules contained in FX services provider 3. Once the client gains access to FX services provider 3, the client may request an FX price quote by invoking a price request application program interface ("API"). In invoking the price request API, the client provides the currency pair of interest, the type and size of transaction contemplated and the tenor of the transaction. For example, the client may request a price for a one year $100 USD/JPY FX forward by including such terms in the price request API and forwarding the request to FX services provider 3. Flow manager 7 receives the price request from the client and forwards the price request to quote engine 9.

Figure 4:
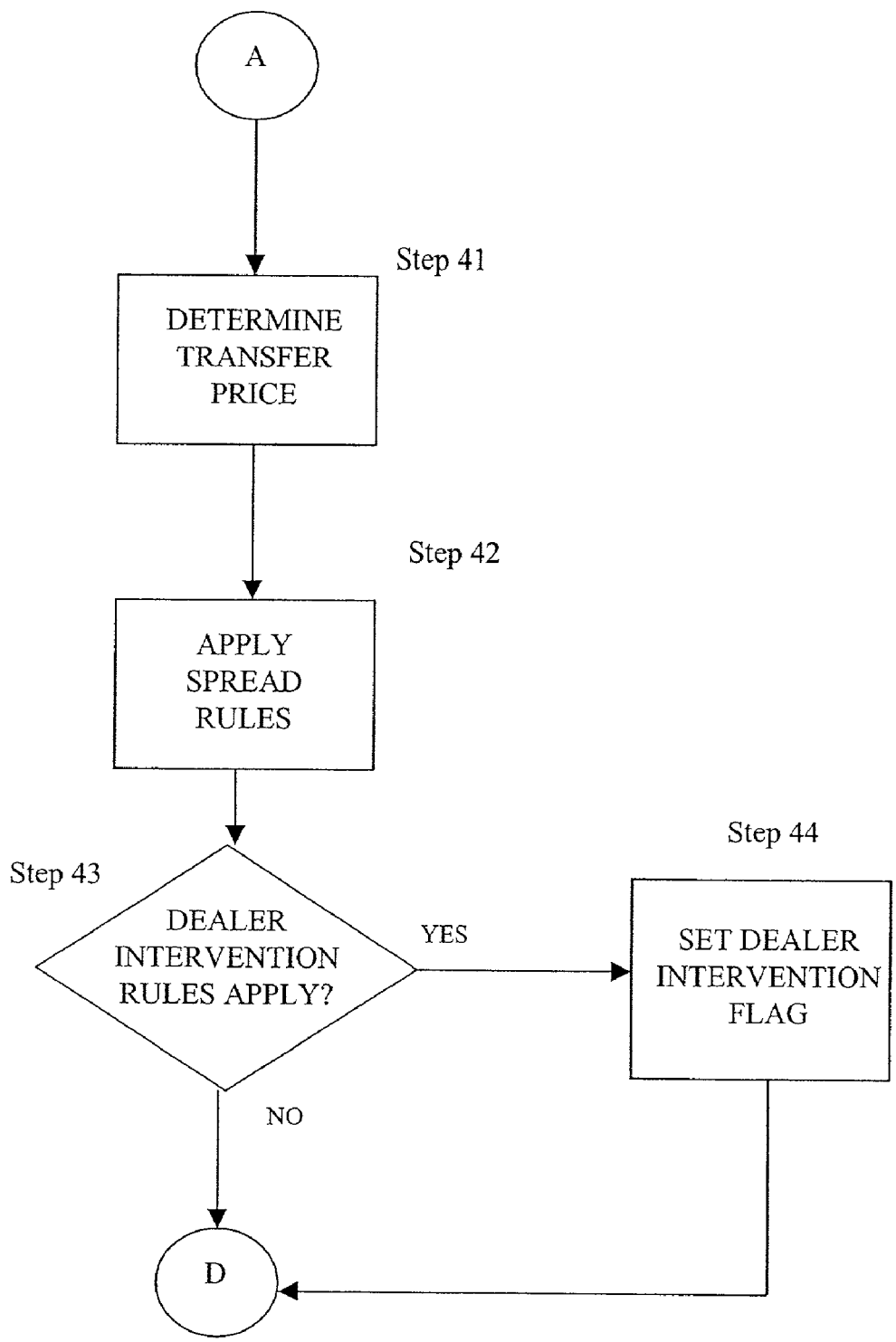
FIG. 4 is a flow chart describing a price quote generation process.

Next, in Step 32, quote engine 9 receives the client price request for the particular transaction and determines the price to be provided to the client in response using a number of factors. Referring now to FIG. 4, there is shown a flow chart describing the price quote generation process. Initially, in Step 41, quote engine 9 determines a transfer price for the transaction, i.e., a price that is valid to trade on within the particular financial institution operating system 1. The transfer price is based on a number of parameters including, but not limited to, the spot price received from a spot ticker 11, the volatility in the market and various risk analysis factors, as is well-known in the art. Once the transfer price is determined, in Step 42, quote engine 9 applies any of a plurality of spread rules that affect the ultimate price to be given to the client in response to the price request. These spread rules affect the price depending on the particular situation and are based on a variety of factors including, by way of non-limiting example, the size of the trade and the status of the requesting client. For example, if a preferred client requests a price quote for a $500,000 USD/JPY FX FWD transaction, then quote engine 9 determines the price based on the transfer price. If, however, the client is not a preferred client or the contemplated transaction size is small or exceedingly large, then quote engine 9 may widen the price spread provided to the client to account for the additional risk inherent in such a transaction. For example, if the transaction is for $5000 instead of $500,000, then quote engine 9 may price the spread at higher price. Similarly, quote engine 9 may widen or narrow the price spread based on any other relevant parameter.

Figure 2A:
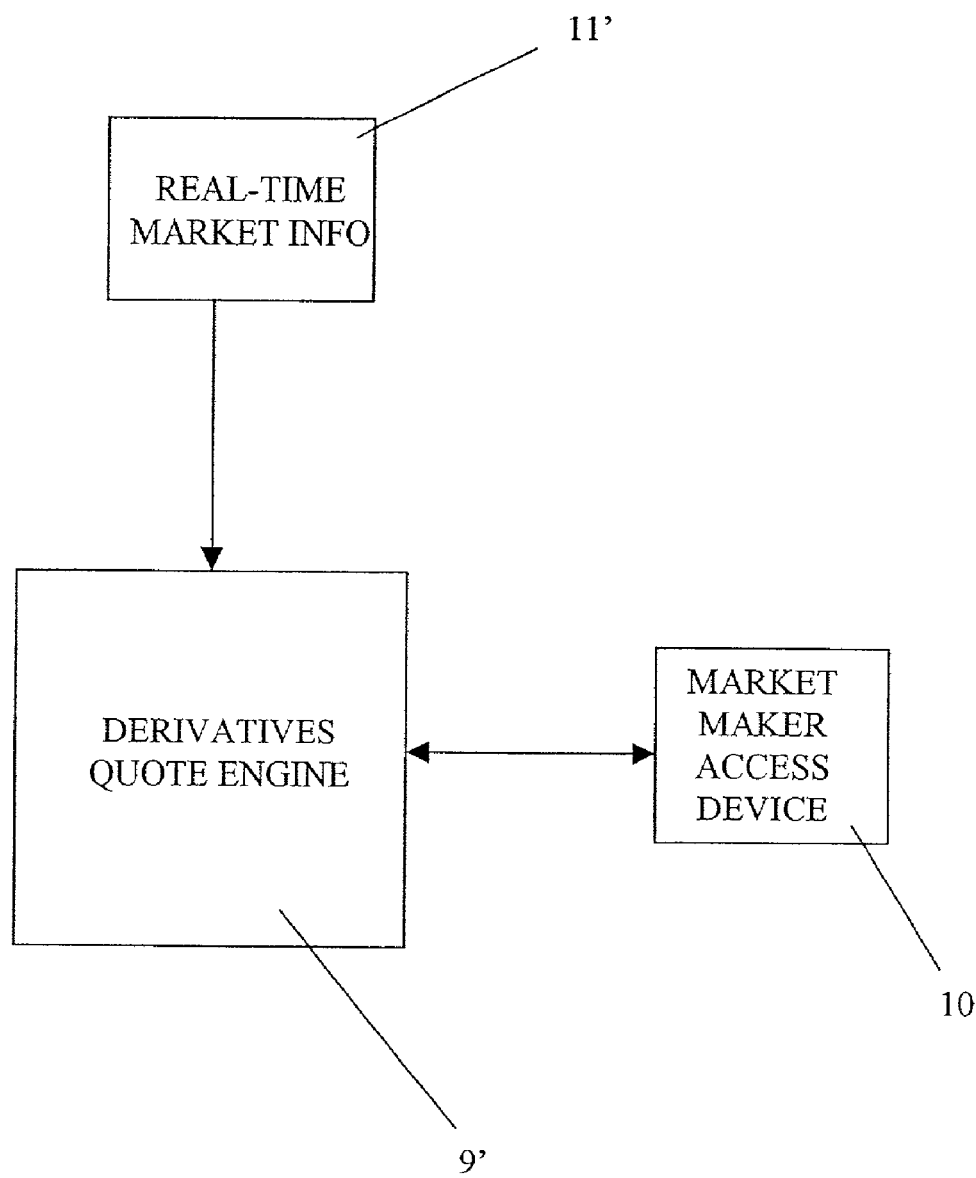
FIG. 2a is shown a block diagram of a derivatives quote engine for providing dealing quotes in derivative securities according to an exemplary embodiment.

Referring now to FIG. 2a, there is shown a block diagram of a derivatives quote engine 9' for providing dealing quotes in derivative securities according to an exemplary embodiment. In this embodiment, derivative quote engine 9' provides the functions of quote engine 9 described above as well as providing price quotes for derivative securities. Quote engine 9' provides price quotes for any type of security, such as FX, equity and commodities, for any type of derivatives including, by way of non-limiting example, vanilla options, spreads, straddles, multi-leg options and exotic options.

To provide price quotes for derivatives, quote engine 9' receives from a market maker, operating a market maker access device 10 (for example, a personal computer), definitions for particular derivatives that includes the volatility surfaces for such derivatives that reflects the market maker's future expectations regarding those derivatives. Quote engine 9' also receives from a real-time market information source 11' real-time market information including, by way of non-limiting example, spot price information and interest rate information. Upon receiving the client price request for a particular derivative, quote engine 9' applies a derivative pricing technique that uses as inputs the real-time market information and a definition provided by the market maker for the particular derivative for providing a dealing price quote in response to the price request. Such a derivative pricing technique may be, for example, linear and spline variance interpolation, linear and spline volatility smile interpolation, by delta or by strike, weekend weighting algorithms and premium interpolation. The price quote provided by quote engine 9' is then forwarded to flow manager 7 and is processed in a similar manner as the price quotes provided by quote engine 9 of FIG. 2.

In certain situations, it is desirable to have a currency trader review a price quote before it is provided to the client. For example, if a client that normally performs transactions in the $100,000 range request a price quote for a $10 million transaction, the financial institution will typically have a trader review the request to determine its validity and the ability of the client to enter into to such a transaction. There are numerous other dealer intervention rules that apply in situations in which the financial institution, based on experience in monitoring client trading patterns and market activity, may desire dealer intervention before issues a price quote. Upon receiving a price request and determining, in Step 43, that one of those situations is implicated, quote engine 9, sets a dealer intervention flag associated with the price request that indicates that the price request is to be forwarded to dealer intervention module 13, via flow manager 7, for manual review.

Figure 5:
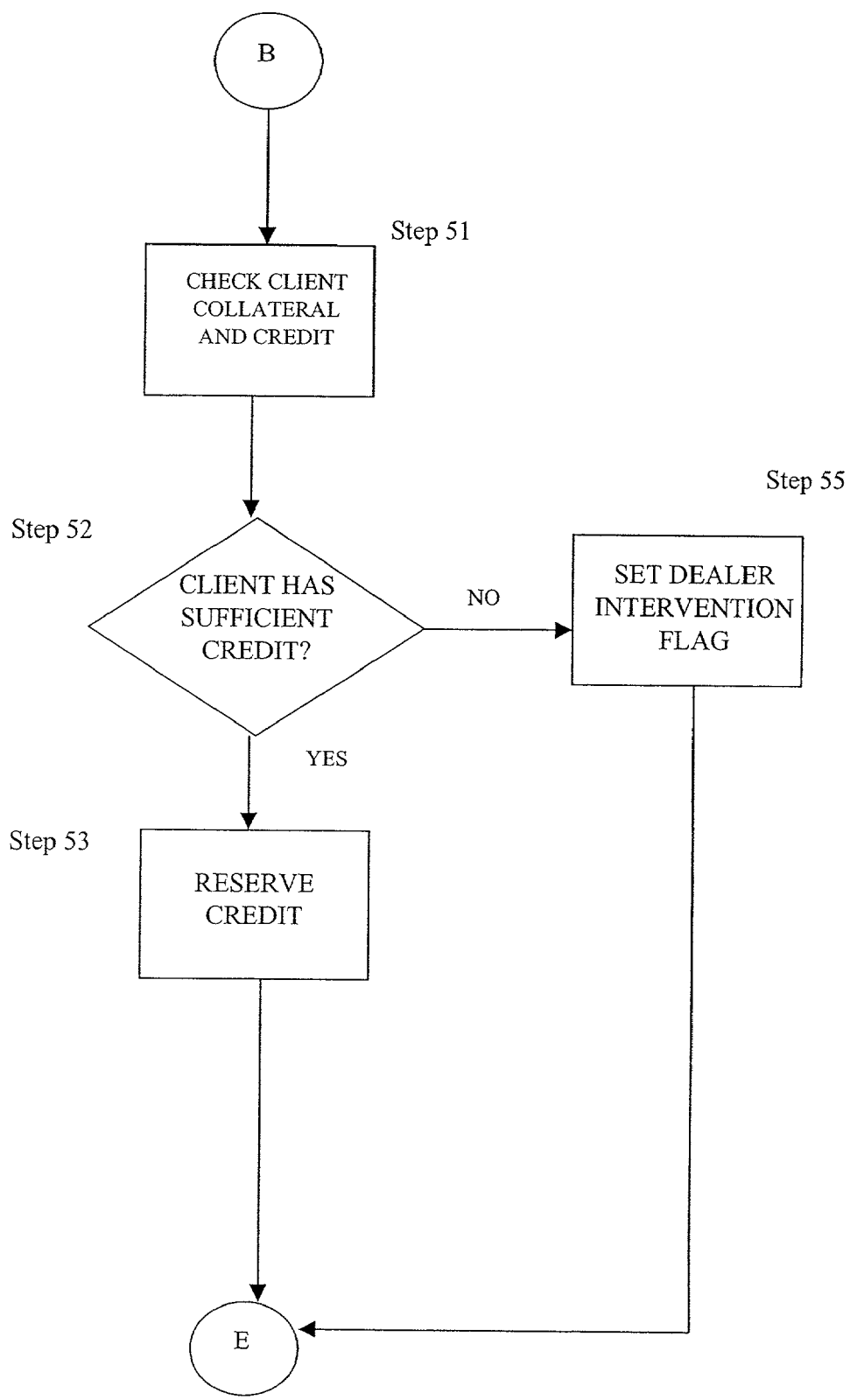
FIG. 5 is a flow chart describing the operations performed by a credit check module.

Before a price quote is provided to the requesting client, quote engine 9 forwards the price request to credit check module 17 to determine, as in Step 33 of FIG. 3, whether the client has the resources to execute the contemplated transaction. Referring now to FIG. 5, there is shown a flow chart describing the operations performed by credit check module 17. Initially, in Step 51, check credit module 17 checks a number of credit related factors including, by way of non-limiting example, the client's credit rating and collateral status with the financial institution using well-known techniques. In the event that credit check module 17 determines, in Step 52, that the client has sufficient resources to execute the contemplated transaction, in Step 53 credit check module 17 reserves a portion of the client's credit line for the duration of the particular price quote. If, on the other hand, it is determined that the client does not have sufficient credit to support the transaction then, in Step 55, credit check module 17 may also determine that the price request requires manual review and therefore may set a dealer intervention flag that causes the price request to be forwarded to dealer intervention module 13 for review by a trader. In this way, the financial institution is assured that the client has the trading power in the event the client executes the contemplated trade for which the client requested a price quote.

Figure 5A:
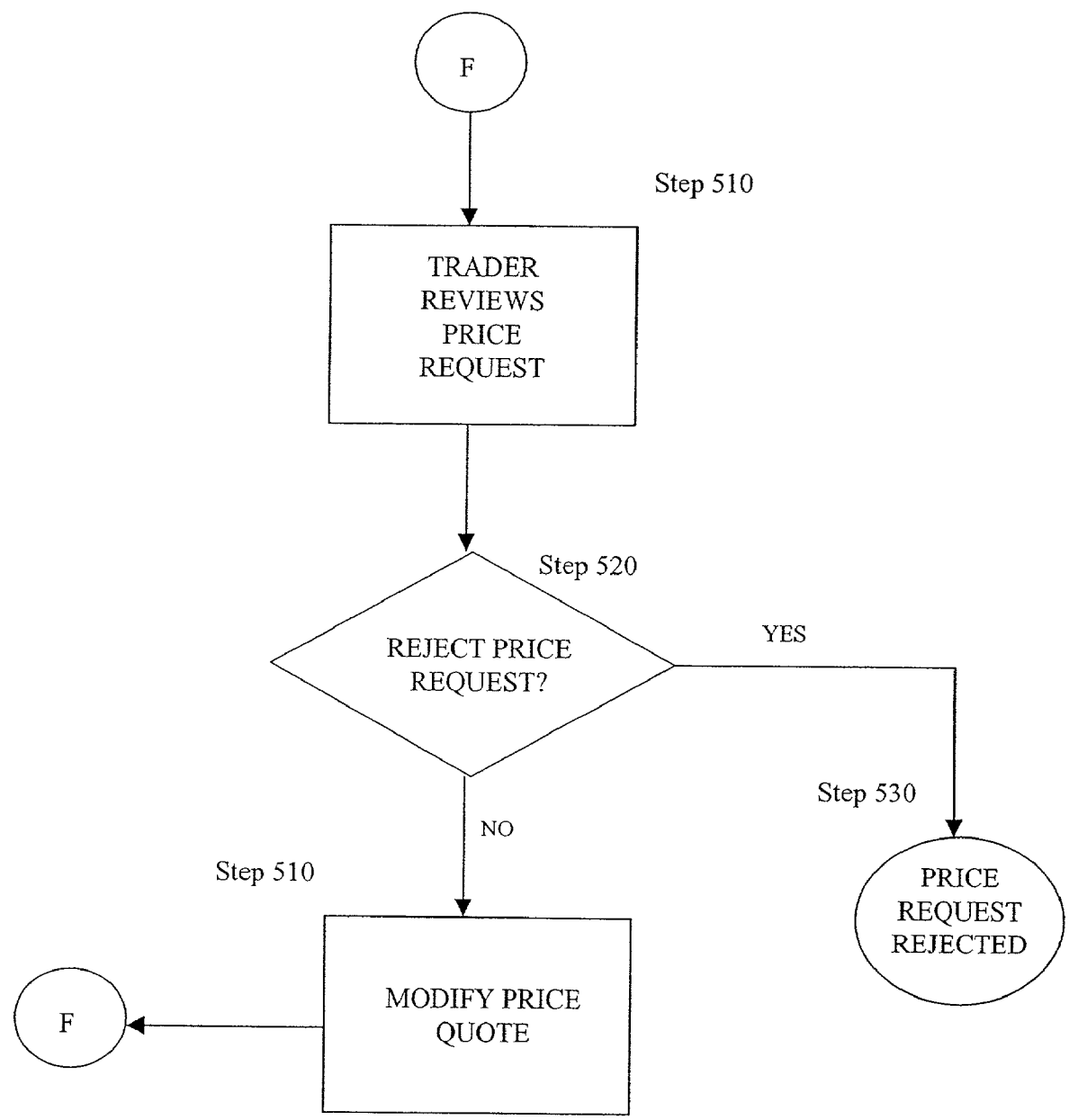
FIG. 5a is a flow chart describing the operations performed by a dealer intervention module.

Next, in Step 38, it is determined whether a dealer intervention flag has been set for the particular price request and, if it was, the price request is forwarded to dealer intervention module 13 for review. Referring now to FIG. 5a, there is shown a flow chart describing the operations performed by dealer intervention module 13. Initially, in Step 510, a trader operating trader access device 15 that may be, for example, a personal computer, reviews the price request for any number of factors including, for example, the clients credit status and the financial institution's risk position. After reviewing the price request, in Step 520, the trader decides whether the to reject the price request in which case the price request is rejected in Step 530. Otherwise, in Step 540, the trader may modify the price quote in any number of ways including, by way of non-limiting example, by widening the price spread, limiting the transaction amount or shortening the tenor. The trader may modify the price quote, for example, if the price quote is for a large notional or if the market is volatile at the time. Similarly, the trader may review the price request for any other purpose and impose restrictions regarding the price quote according to well-known risk management techniques.

In addition to examining and modifying specific price quotes, dealer intervention module 13 may also be used by a trader operating trader access device 15 to control the pricing and trading activity of FX services provider 3 in certain situations. For example, in a volatile market, the trader may require that all price quotes be sent to dealer intervention module 13 for review by the trader because quote engine 9 will be unable to effectively generate prices in a fast moving market. In such as case, the trader causes dealer intervention module 13 to set a flag in flow manager 7 indicating that flow manager 7 is to send all price quotes to dealer intervention module 13 for review before the price quotes are released to the client.

In addition to requiring that all price quotes be reviewed manually, the trader may also place general limits on the prices provided by quote engine 9 that protect the financial institution's risk position. Such limits may include, by way of non-limiting example, the maximum notional amount that a price quote is to be provided for, the maximum tenor allowed and a minimum price spread width. Dealer intervention module 13 communicates these pricing limitations to quote engine 9 via flow manager 7. Thus, dealer intervention module 13 acts as a circuit breaker in which a trader can control pricing and trading activity under certain market conditions.

Once a price quote has been determined by quote engine 9 and has been reviewed by credit check module 17 and dealer intervention module 13, as necessary, in Step 34 of FIG. 3, flow manager 7 communicates the price quote to the client via client access device 2. Next, in Step 37, it is determined whether the client has requested a trade based on the price quote received. If a trade request is received from the client then, in Step 35, it is determined whether the price quote duration has expired and, if so, in Step 36, credit check module 17 releases the reserve previously placed on the client's credit line. If it is determined, in Step 35, that the client has requested a trade by invoking a request trade API that includes the parameters of the price quote, then flow manager 7 receives the trade request for processing.

Figure 6:
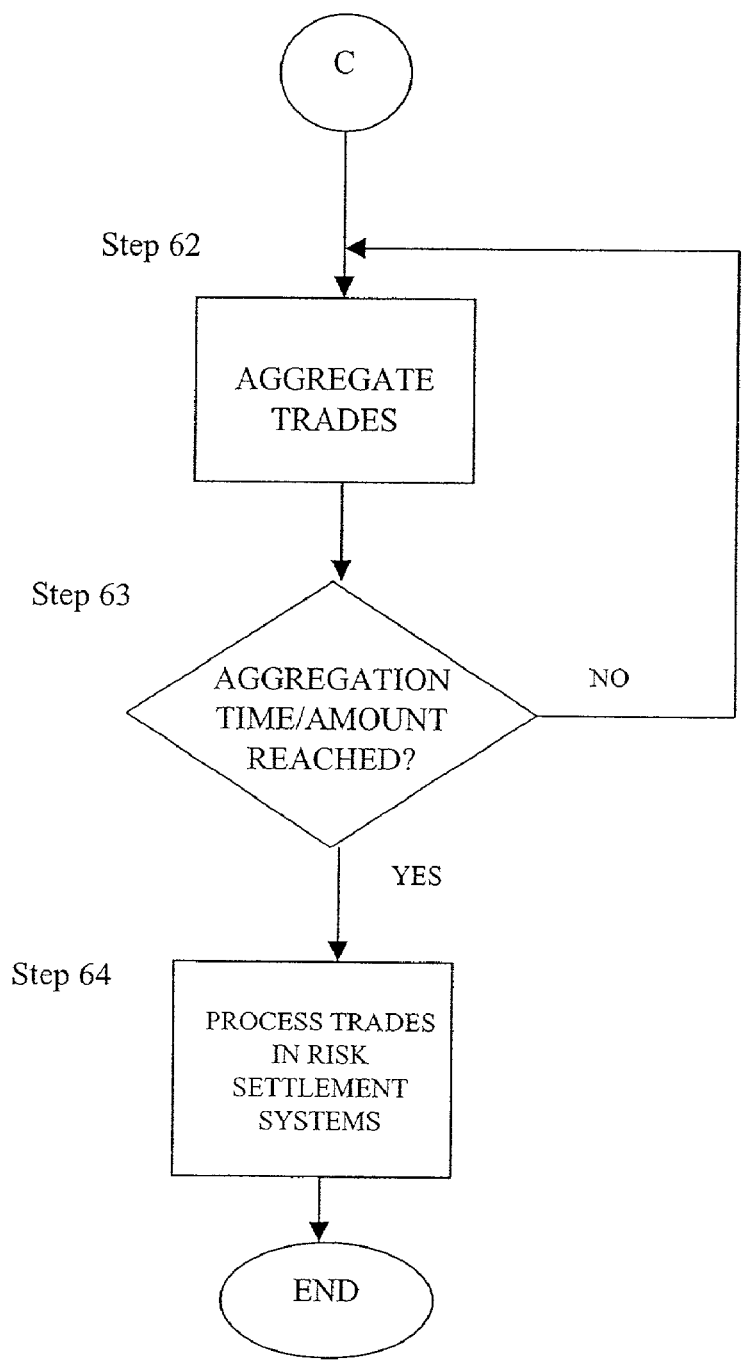
FIG. 6 is a flow chart describing the steps included in processing a trade request.

Referring now to FIG. 6, there is shown a flow chart describing the steps included in processing a trade request. Initially, trade aggregator 19 receives valid trade requests from flow manager 7 and aggregates them, in a manner to be described, so that the financial institutions real-time risk management and trade settlement systems 21 do not become overwhelmed by a large volume of trades having a small notional amount within a short period of time. This may occur, for example, if FX services provider 3 is providing FX services to a large number of retail clients that typical transact in small amounts. To prevent systems 21 from damage, in Step 62 aggregator 19 aggregates trades having similar parameters, such as currency pair, transaction type and tenor, until a combined notional amount, such as for example $50,000 is reached. In an exemplary embodiment, aggregator 19 may aggregate trades until either a combined notional amount is reached or an aggregation period of time has elapsed, whichever comes first. In this way, if a sufficient number of trades needed to reach the combined notional amount is not received by aggregator 19 within a set period of time, small trades waiting to be processed do not remain in aggregator 19 for more than the set period of time. Once it is determined, as in Step 63, that the combined notional amount is reached or the aggregation period has passed, aggregator 19 then forwards the aggregated trades as if they were one single trade to risk management and trading systems 21 for processing, as in Step 64. Thus, systems 21 only have to process one large aggregated transaction as opposed to numerous small transactions and therefore will not become overwhelmed by a large spike in the volume trades.

Figure 7:
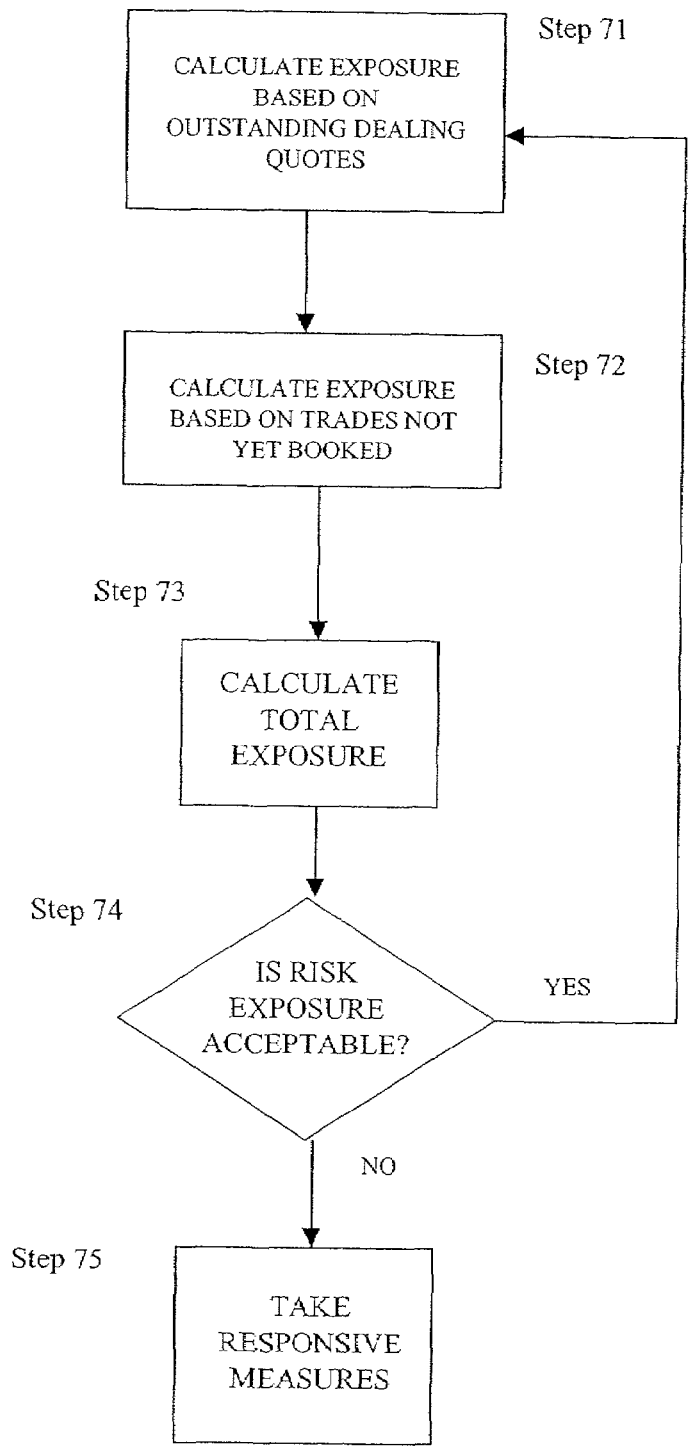
FIG. 7 is a flow chart describing the steps taken by an exposure manager for tracking a financial institution's risk exposure.

Referring now to FIG. 7, there is shown a flow chart describing the steps taken by exposure manager 23 for tracking the financial institution's risk exposure as a result of its providing to clients dealing quotes that remain valid for a given duration. Because FX services provider 3 provides clients with dealing quotes that the clients can trade on within the quote duration, the financial institution's risk position at any given time must also account for the risk exposure that would accrue to the financial institution if any clients execute a transaction based on an outstanding dealing quote. To track such risk, in Step 71, exposure manager 23 tracks all outstanding dealing quotes that have yet to expire and, based on real-time pricing information received from spot ticker 11, determines the potential risk exposure that may arise if the dealing quotes were traded on by the particular clients. In Step 72, exposure manager 23 also tracks all trades that have been accepted by clients but have not yet been booked into the financial institution's risk management systems, because, for example, the risk management systems are unable to keep pace with trading activity or are inoperable. Then, in Step 73, exposure manager calculates the total risk exposure facing the financial institution resulting from dealing quotes being accepted y clients and trades not yet booked by the risk systems. If exposure manager 23 determines, in Step 74, that the financial institution is exposed to an unacceptable level of risk based on outstanding dealing quotes or trades that have not been booked into the institution's risk systems, then exposure manager 23 may take any number of responsive measures, in Step 75. For example, exposure manager 23 can cause all future price quotes to be routed to dealer intervention module 13 for manual review by a trader. Alternatively, exposure manager 23 may direct quote engine 9 to either widen the spread, shorten the duration or shorten the tenor of any future price quotes. Similarly, exposure manager 23 can implement any other response in order to manage the risk to the financial institution.

If, on the other hand, exposure manager 23 determines that the risk posed from the outstanding dealing quotes and trades not yet booked is acceptable, then in the process returns to Step 71 in which exposure manager 23 calculates the risk exposures again.

As described above, block trade manager 25 manages the price allocation and risk management for block trades. In certain situations, a large client may desire a price for a large notional and would like that price to be applied over a number of smaller individual transactions. For example, the client may provide block trade manager 25 with a list of fifty price requests each having the same currency pair and tenor, and would like a price quote based on the aggregate notional amount of the fifty price requests. In such a case, block trade manager 25 receives the block trade price request and provides the client with a price quotes based the aggregate of the fifty individual price requests. In some cases the client desires a block quote for a group of trades having different currency pairs and/or tenors. In this case, block trade manager 25 aggregates individual trades having the same currency pair and tenor separately and provides the client with a price for each separate group.

Figure 8:
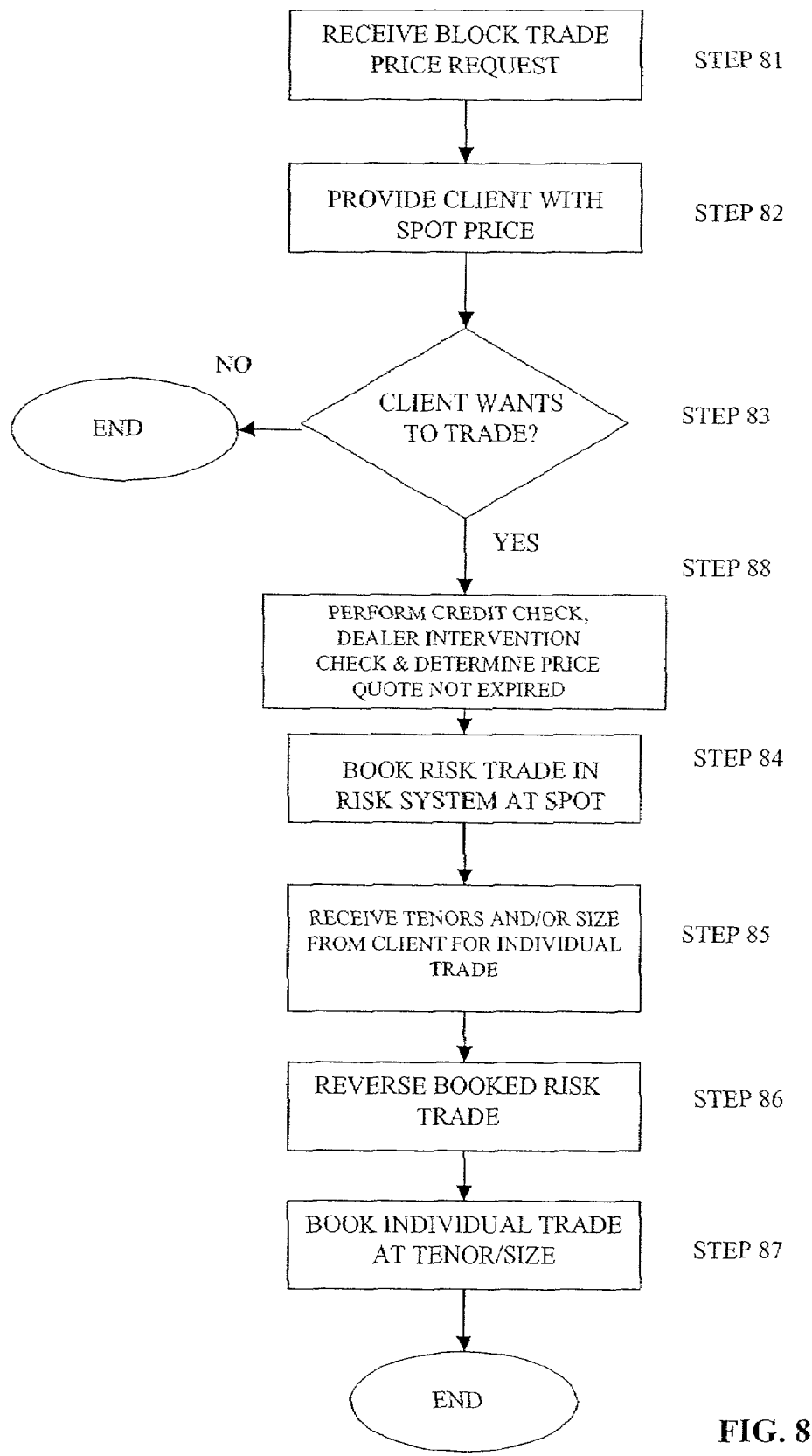
FIG. 8 is shown a flow chart describing the steps taken by a block trade manager for managing the price allocation and risk management of block trades.

Referring now to FIG. 8, there is shown a flow chart describing the operation of block trade manager 25 in a situation where the client does not include the tenor of the individual transactions at the time of the block trade request but still wants a price quote for the combined notional amount. Because the client does not provide tenors for the individual transactions, risk related to the forward component of any transaction cannot be accounted for. In this case, in Step 81, block trade manager 25 receives the block trade price request and, in Step 82, provides the client with a spot price for the group of transactions. This spot price generally accounts for the majority of risk associated with a forward contract because the spot component represents the most volatile part of a forward contract. If it is determined, in Step 83, that the client desires to execute the block trade based on the price provided for the block of transactions then, in Step 88, a credit check and dealer intervention check is performed in a similar manner as described above. If it is also determined that the price quote has not expired then, in Step 84, block trade manager 25 will book to the financial institutions risk systems a risk trade at spot to account for the spot risk the institution is now exposed to. When the client later, in Step 85, provides tenors for the individual trades that made up the block trade, in Step 86 block trade manager 25 reverses the previously booked spot trade and then, in Step 87, books the individual trades based on the provided tenors. Alternatively, the client may provide tenors for only a portion of individual trades at a time. In this case, block trade manager 25 reverses only a portion of the previously booked block trade and books instead those individual trades for which a tenor was provided.

In yet another situation, the client does not indicate the number of individual transactions across which the block trade request is to be distributed. Because each of the individual transactions may have different tenors, the risk related to each individual transaction cannot be accounted for. In this case too block trade manager 25 provides the client with a block price at spot and, if the client decides to execute the block trade, books to the risk books a risk trade at spot that equals the notional for the entire contemplated block trade. Subsequently, when the client indicates the number of and size of the individual transactions, block trade manager 25 reverses all or a portion of the booked risk trade and books instead the individual trades using the tenor and notional amounts provided by the client. Furthermore, in the event that the notional amounts of the individual transactions do not equal the original block trade amount, block trade manager 25 determines whether the block price previously provided has to be changed with respect to any of the individual trades.

Accordingly, block trade manager 25 allows the financial institution that is using system 1 to easily support its client's block trade requests while not exposing the institution to any unnecessary risk.

As described above, clients request price quotes and trades from system 1 by invoking an API that includes the details of the client's specific request. Thus, the APIs provide the clients with a method of accessing the FX services provided by system 1. By providing clients with API access, the present invention enables clients to incorporate FX services into any existing or new client application by simply incorporating the APIs into such applications, as appropriate. Allowing integration into client's existing software applications via APIs, as opposed to requiring the client to use a special GUI to access FX applications, as in the system of the '402 patent, simplifies the integration of FX services into the client's existing software applications and also reduces training and implementation costs. Furthermore, the clients can use the APIs to build new applications for their specific needs that incorporate FX services in novel ways.

Accordingly, a method and system is provided for flexibly providing real-time FX trading services and managing the risks associated with such services. Furthermore, it will be obvious to one of ordinary skill to apply the method and system of the above invention to trading services for securities other than FX such as, by way of non-limiting example, over-the-counter securities, debt instruments, commodities and equities.

Based on the above description, it will be obvious to one of ordinary skill to implement the present invention in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Furthermore, alternate embodiments of the invention that implement the system in hardware, firmware or a combination of both hardware and software, as well as distributing modules and/or data in a different fashion will be apparent to those skilled in the art and are also within the scope of the invention. In addition, it will be obvious to one of ordinary skill to use a conventional database management system such as, by way of non-limiting example, Sybase, Oracle and DB2, as a platform for implementing the present invention.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

The invention claimed is:

1. An automated method for managing risk associated with providing real-time trading services, comprising the automated steps of:

receiving a plurality of dealing price quotes previously provided in response to client requests, each of said plurality of dealing price quotes being an offer from a financial institution to perform a trade in a security or a derivative and having a limited duration for acceptance, the plurality of dealing price quotes comprising expired dealing price quotes and pending dealing price quotes that are not expired;

proactively calculating individual risk exposures to the financial institution resulting from potential trades in securities or derivatives associated with each of said pending dealing price quotes during said respective durations, each of said individual risk exposures being calculated using real time pricing information of a corresponding security or derivative;

calculating a total risk exposure to the financial institution based on said individual risk exposures of said pending dealing price quotes; and subsequent to calculation of said total risk exposure, adjusting a next dealing price quote being offered in response to a next client request based on said total risk exposure in order to reduce the total risk exposure to the financial institution.

2. The automated method of claim 1, further comprising the automated step of:

providing at least one of said plurality of dealing price quotes as an offer to perform a trade in a security or a derivative that is based on a size of said trade.

3. The automated method of claim 2, further comprising the automated steps of:

providing at least one of said plurality of dealing price quotes to a client having a preferred client status; and determining said at least one of said plurality of dealing price quotes based on said preferred client status.

4. The automated method of claim 1, further comprising the automated step of:

determining at least one of said plurality of dealing price quotes based on risk analysis and market volatility.

5. The automated method of claim 1, further comprising the automated steps of:

evaluating credit of a client;

providing said at least one of said plurality of dealing price quotes to said client upon determining that said credit is equal to or greater than a monetary amount to perform the trade; and reserving a portion of said client's credit for said limited duration of said at least one of said plurality of dealing price quotes.

6. The automated method of claim 5, further comprising the automated step of:

reserving said portion of said client's credit that equals a size of said trade.

7. The automated method of claim 5, further comprising the automated step of:

releasing said portion of said client's credit when said limited duration has expired and said client has not performed a trade in said security or said derivative based on said at least one of said plurality of dealing price quotes.

8. The automated method of claim 1, further comprising:

enabling a dealer to manually review said at least one of said plurality of dealing price quotes before said at least one of said plurality of dealing price quotes is provided to a client.

9. The automated method of claim 1, further comprising the automated steps of:

limiting a size associated with at least one of said plurality of dealing price quotes.

10. The automated method of claim 1, further comprising the automated steps of:

limiting a tenor associated with at least one of said plurality of dealing price quotes.

11. The automated method of claim 1, further comprising the automated steps of:

widening a spread associated with at least one of said plurality of dealing price quotes.

12. The automated method of claim 1, further comprising the automated steps of:

adjusting a duration of said next dealing price quote.

13. The automated method of claim 1, further comprising the automated step of:

adjusting a tenor of said next dealing price quote.

14. The automated method of claim 1, further comprising the automated step of:

adjusting a spread of said next dealing price quote.

15. The automated method of claim 1, further comprising the automated steps of:

enabling a dealer to manually review said next dealing price quote.

16. The automated method of claim 1, further comprising the automated steps of:

executing at least one trade based on at least one of said pending dealing price quotes;

calculating an individual risk exposure to the financial institution associated with said at least one trade that has not been booked into a risk management system;

calculating said total risk exposure based on said individual risk exposures of said pending dealing price quotes and said individual risk exposure for said at least one trade that has not been booked into said risk management system; and subsequent to calculation of said total risk exposure, adjusting said next dealing price quote based on said total risk exposure.

17. The automated method of claim 16, further comprising the automated step of:

booking said at least one trade into said risk management system.

18. The automated method of claim 16, further comprising the automated steps of:

aggregating all of said at least one trade; and booking all of said at least one trade when a threshold is reached.

19. The automated method of claim 18, further comprising the automated step of:

booking all of said at least one trade when said threshold is reached, said threshold being an aggregated notional amount.

20. The automated method of claim 18, further comprising the automated step of:

booking all of said at least one trade when said threshold is reached, said threshold being a time limit.

21. The automated method of claim 1, further comprising the automated step of:

providing said plurality of dealing price quotes for foreign exchange securities.

22. The automated method of claim 1, further comprising the automated step of:

providing said plurality of dealing price quotes for foreign exchange derivatives.

23. The automated method of claim 1, further comprising the automated step of:

providing said plurality of dealing price quotes for derivatives selected from the group consisting of vanilla options, multi-leg options and exotic options.

24. The automated method of claim 1, further comprising the automated step of:

providing said plurality of dealing price quotes for securities selected from the group consisting of equities, over-the-counter securities and debt instruments.

25. An automated system for managing risk associated with providing real-time trading services, comprising:

a quote engine module;

an exposure manager module programmed to receive a plurality of dealing price quotes previously provided by said quote engine module in response to client requests, each of said plurality of dealing price quotes being an offer from a financial institution to perform a trade in a security or a derivative and having a limited duration for acceptance, the plurality of dealing price quotes comprising expired dealing price quotes and pending dealing price quotes that are not expired;

said exposure manager module programmed to proactively calculate individual risk exposures to the financial institution resulting from potential trades in securities or derivatives associated with each of said pending dealing price quotes during said respective durations, each of said individual risk exposures being calculated using real time pricing information of a corresponding security or derivative;

said exposure manager module programmed to calculate a total risk exposure to the financial institution based on said individual risk exposures of said pending dealing price quotes; and said quote engine module programmed to adjust, subsequent to calculation of said total risk exposure, a next dealing price quote being offered in response to a next client request based on said total risk exposure in order to reduce said total risk exposure to the financial institution.

26. The automated system of claim 25, wherein:

said quote engine module is programmed to provide said plurality of dealing price quotes as an offer to perform a trade in a security or a derivative and said quote engine module is programmed to determine at least one of said plurality of dealing price quotes based on a size of said trade.

27. The automated system of claim 26, wherein:

said quote engine module is programmed to provide at least one of said plurality of dealing price quotes to a client having a preferred client status and said quote engine module is programmed to determine said at least one of said plurality of dealing price quotes based on said preferred client status.

28. The automated system of claim 25, wherein said quote engine module is programmed to determine said plurality of dealing price quotes based on risk analysis and market volatility.

29. The automated system of claim 25 further comprising:

a credit check module programmed to evaluate credit of a client;

said quote engine module programmed to provide said at least one of said plurality of dealing price quotes to said client upon determining that said credit is equal to or greater than a monetary amount to perform the trade; and said credit check module programmed to reserve a portion of said client's credit for said limited duration of said at least one of said plurality of dealing price quotes.

30. The automated system of claim 29, wherein said credit check module is programmed to reserve said portion of said client's credit that equals a size of said trade.

31. The automated system of claim 29, wherein said credit check module is programmed to release said portion of said client's credit when said limited duration has expired and said client has not performed a trade in said security or said derivative based on said at least one of said plurality of dealing price quotes.

32. The automated system of claim 25 further comprising:

a dealer intervention module is programmed to enable a dealer to manually review said at least one of said plurality of dealing price quotes before said at least one of said plurality of dealing price quotes is provided to a client.

33. The automated system of claim 32, wherein said dealer intervention module is programmed to enable a dealer to automatically limit a size associated with at least one of said plurality of dealing price quotes.

34. The automated system of claim 32, wherein said dealer intervention module is programmed to enable a dealer to automatically limit a tenor associated with at least one of said plurality of dealing price quotes.

35. The automated system of claim 32, wherein said dealer intervention module is programmed to enable a dealer to automatically widen a spread associated with at least one of said plurality of dealing price quotes.

36. The automated system of claim 32, wherein said dealer intervention module is programmed to enable a dealer to automatically adjust said duration of said next dealing price quote.

37. The automated system of claim 32, wherein said dealer intervention module is programmed to enable a dealer to automatically adjust a tenor of said next dealing price quote.

38. The automated system of claim 32, wherein said dealer intervention module is programmed to enable a dealer to automatically adjust a spread of said next dealing price quote.

39. The automated system of claim 32, wherein said dealer intervention module is programmed to enable a dealer to manually review said next dealing price quote.

40. The automated system of claim 25, further comprising:

a risk management system;

a trade settlement system module programmed to execute at least one trade based on one of said pending dealing price quotes;

said exposure manager module programmed to calculate an individual risk exposure to the financial institution associated with said at least one trade that has not been booked into said risk management system;

said exposure manager module programmed to calculate said total risk exposure based on said individual risk exposures of said pending dealing price quotes and said individual risk exposure for said at least one trade that has not been booked into said risk management system; and said quote engine module being programmed to adjust, subsequent to calculation of said total risk exposure, said next dealing price quote based on said total risk exposure.

41. The automated system of claim 40, wherein said risk management system is programmed to book said at least one trade.

42. The automated system of claim 40, further comprising a trade aggregator module programmed to aggregate all of said at least one trade and programmed to book all of said at least one trade into said risk management system when a threshold is reached.

43. The automated system of claim 42, wherein said trade aggregator module is programmed to book all of said at least one trade into said risk management system when a threshold is reached, said threshold being an aggregated notional amount.

44. The automated system of claim 42, wherein said trade aggregator module is programmed to book all of said at least one trade into said risk management system when a threshold is reached, said threshold being a time limit.

45. The automated system of claim 25, wherein said quote engine module is programmed to provide said plurality of dealing price quotes for foreign exchange securities.

46. The automated system of claim 25, wherein said quote engine module is programmed to provide said plurality of dealing price quotes are for foreign exchange derivatives.

47. The automated system of claim 25, wherein said quote engine module is programmed to provide said plurality of dealing price quotes for derivatives selected from the group consisting of vanilla options, multi-leg options and exotic options.

48. The automated system of claim 25, wherein said quote engine module is programmed to provide said plurality of dealing price quotes are for securities selected from the group consisting of equities, over-the-counter securities and debt instruments.

* * * * *